Dec. 5, 1939.  P. WHITCOMB  2,182,507
VARIABLE SPEED POWER TRANSMISSION
Filed Feb. 2, 1939  5 Sheets-Sheet 1

Dec. 5, 1939.  P. WHITCOMB  2,182,507
VARIABLE SPEED POWER TRANSMISSION
Filed Feb. 2, 1939  5 Sheets-Sheet 3

Fig.7

Inventor
Preston Whitcomb
by Roberts Cushman & Woodberry
att'ys.

Dec. 5, 1939.  P. WHITCOMB  2,182,507
VARIABLE SPEED POWER TRANSMISSION
Filed Feb. 2, 1939  5 Sheets-Sheet 5

Inventor
Preston Whitcomb
by Roberts Cushman Woodbury
Att'ys.

Patented Dec. 5, 1939

2,182,507

UNITED STATES PATENT OFFICE 2,182,507

VARIABLE SPEED POWER TRANSMISSION

Preston Whitcomb, Buffalo, N. Y., assignor to Manning, Maxwell & Moore, Incorporated, New York, N. Y., a corporation of New Jersey Application February 2, 1939, Serial No. 254,269

13 Claims. (Cl. 74—230.18)

This invention pertains to variable speed power-transmission apparatus of the kind in which power is transmitted by an endless flexible belt or the like from a driving to a driven pulley, and wherein provision is made for varying the effective relative diameters of the pulleys thereby to change the speed ratio.

Apparatus of this kind is useful, among other things, for properly obtaining or adjusting the speed of a machine provided with an independent driving motor. For such use it is often requisite that the variable speed apparatus be as compact and small as possible by reason of limitations in the space available for its installation, in particular when, as is sometimes the case, the variable speed apparatus must be housed within the casing of the machine, thus, in effect, becoming a unitary part of the latter. Manifestly when designed with such limitations in view, the distance between the axes of the driving and driven pulleys may be quite small, for instance, not substantially greater than the maximum effective diameter of the other pulley. Such an arrangement involves problems of belt slippage and tension maintenance, not so manifest nor important in more usual forms of belt transmission in which the distance between the pulley axes is often very great as compared with the pulley diameters.

Apparatus of this general type usually has been designed to employ a V-belt in order to obtain as great a contact surface and as high a pressure as possible between the belt and pulley face, thereby to reduce slippage, and the apparatus of the present invention makes use of a V-belt for the same reasons. Various proposals have heretofore been made for varying the effective diameter of one or both pulleys of such an apparatus, but so far as is known to me, no prior construction has adequately provided for variation of the effective diameters of the driving and driven pulleys and for shifting the belt smoothly and easily from one diameter to the other, all while the belt is running and while concomitantly maintaining proper belt tension, even though the pulley axes be as close as the diameters of the pulleys will permit, so that idler pulleys or the like, commonly employed for maintaining constant belt tension, cannot be used.

Neither has any prior device, so far as I am aware, been so designed as to ensure ease in adjustment coupled with effective and dependable maintenance of a given adjustment during a prolonged period of use. Nor has such prior apparatus, so far as I am acquainted with it, been so constructed and arranged as, without substantial change, to permit the power-receiving and power-delivery connections to be disposed both at the same side of the apparatus or at opposite sides at will.

The present invention affords a transmission of such a type wherein each of the pulleys may comprise two opposed faces including a plurality of concentric rings or convolutions, means being provided to adjust rings of the opposite faces of one pulley toward one another as rings of the other pulley are adjusted away from one another. The present invention affords simple and compact control means for this purpose, which permits the driving and driven shafts to have connections with the prime mover and with the driven mechanism arranged conveniently and in a compact assembly with the transmission. The present invention permits simultaneous adjustment of rings in each face of each pulley but only requires means extending from one side of each pulley to effect such an adjustment, and also permits the proper and efficient operation of the belt and the proper engagement thereof with successive portions of the pulley surfaces as the device is being adjusted while in operation.

To permit the adjustment of the rings which thus constitute the pulley faces in the manner described, I prefer to provide a part, herein termed an "actuator", slidable axially on each pulley shaft and connected by flexible transmission elements, such as chains, to rigid wedge members which engage the rings. Springs tend to urge the rings in opposed faces of the pulley away from each other and tend to hold the rings in engagement with the wedge members. The flexible transmission elements or chains comprised in the adjusting mechanism each normally has a run extending parallel to the axis of the pulley and connected to the actuator and a radially disposed run connected to the corresponding wedge member. The two actuators preferably are simultaneously moved by cooperating cam means which in turn is operated by a screw thread and hand wheel or the like. The cam means is so shaped as to effect variation in the rate of adjustment of the pulleys in ranges of different effective diameters, thus, for example, allowing a somewhat slower range of adjustment for the pulley which for the time being has the relatively large effective diameter than for the pulley which has the relatively small effective diameter, the cam elements being so designed as to ensure that the endless belt or equivalent element will be kept under substantially uniform tension throughout the range of adjustment.

Other and further objects, advantages and improved structural features will be pointed out hereafter in the following more detailed description and by reference to the accompanying drawings wherein.

As here illustrated, the improved power transmission apparatus comprises a rigid support or frame for the shafts upon which the pulleys are mounted and for the adjusting means by which the effective diameters of the pulleys are varied. As shown, this support or frame takes the form of a casing comprising a box-like base 1 and an upper part or housing 2 (Fig. 2) detachably secured to the base by fastenings 3. The top of the housing 2 is constituted by a removable cover 5. A hand wheel 6 for manually effecting the adjustment of the pulley diameters is fixed to the outer end of a shaft 6ᵃ journaled near its outer end in a bearing 6ᵇ carried by the housing 2. The parallel shafts 8 and 8ᵃ on which the driving and driven pulleys are mounted turn in bearings secured to the opposite walls of the base 1. Since the transmission herein disclosed is intended to be used where little space is available, for instance as an adjunct to a machine or other power-using appliance, the shafts 8 and 8ᵃ are spaced apart a distance here shown as a little greater than the maximum diameter of the larger pulley, but such arrangement involves difficulties in design and operation which it is a principal object of the present invention to overcome.

Figures 6, 15, 16:
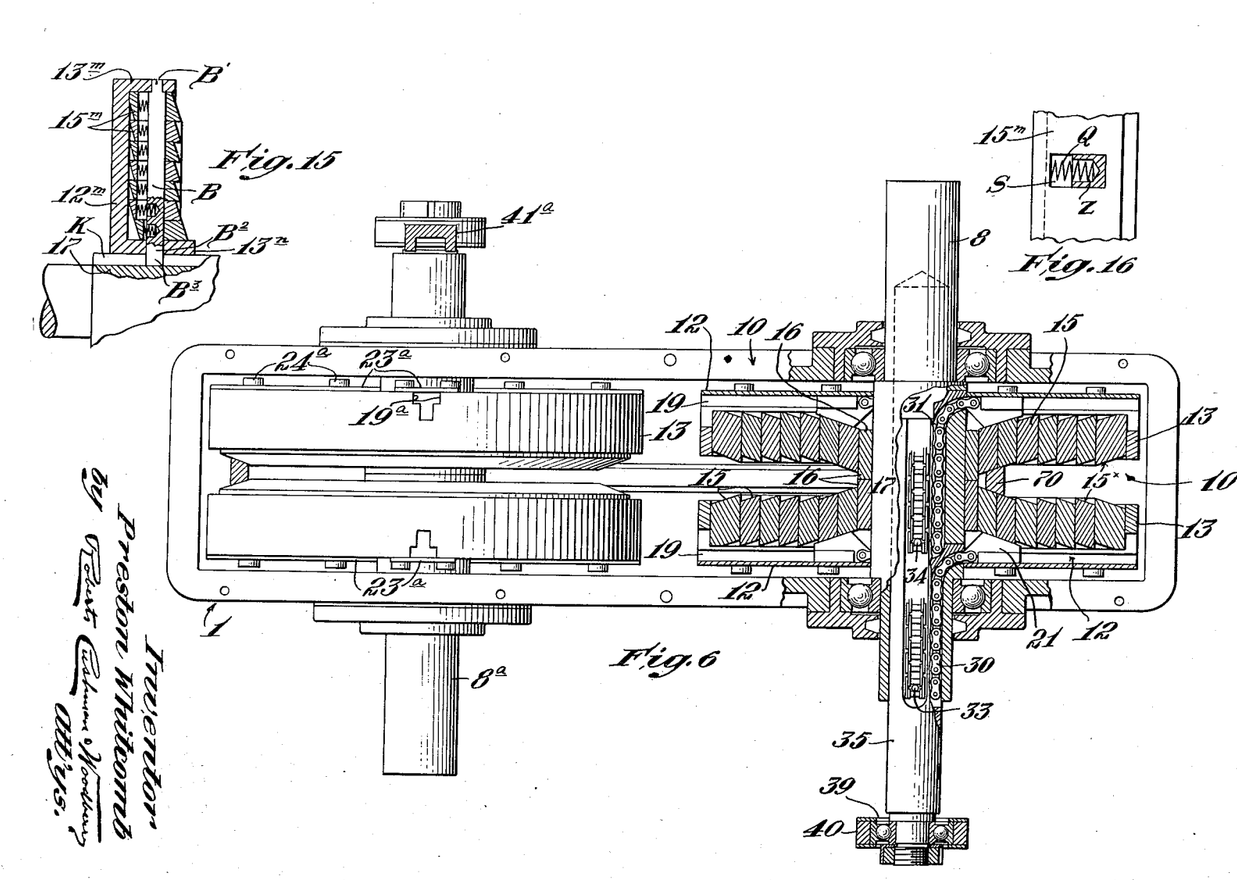
Fig. 6 is a plan view (to larger scale than Fig. 1) of the transmission with the cover removed and with one pulley and the related parts shown in section.
Fig. 15 is a fragmentary radial section illustrating an alternative arrangement of the rings and their controlling springs.
Fig. 16 is a fragmentary peripheral view of one of the rings of Fig. 15, with parts in section.

The driving and driven pulleys which are fixed to the shafts 8 and 8ᵃ are of substantially identical construction so that it is only necessary to describe one of these pulleys in detail. Referring to Fig. 6, the pulley 10, which is mounted on the shaft 8, is shown as comprising a pair of axially spaced annular end plates 12 each having a peripheral flange 13 which encircles and houses a set of concentric rigid rings 15. Each ring has beveled inner and outer faces, and adjoining rings have juxtaposed peripheral cylindrical faces which are in close sliding engagement. The outermost ring preferably has a somewhat greater radial depth than the other rings of the set, while the innermost ring has its inner peripheral surface disposed in engagement with a non-adjustable ring 16 fixed on a hub member 17 secured to or forming an integral part of the shaft 8 and located between the bearings in which the shaft turns.

The plates 12 have radially extending T-slots or guideways each comprising a rabbet 19 (Figs. 6, 9, 10 and 11) formed in the outer surface of the plate and a radial channel 20. A wedge-like ring-adjusting member 21 (Fig. 10) is arranged to slide axially in each of the guideways, each wedge member having flanges 22 which slide in the rabbets 19 and a body portion which projects through and slides in the channel 20. Cover plates 23 are secured, as by fastenings 24, to the outer faces 12 of the plates thereby to confine the wedges 21 in their guideways.

The inner faces 25 of the wedge members 21 are beveled (Fig. 10) to conform to the correspondingly beveled outer edges of the rings 15. If desired, the outer faces of the rings may be beveled only at the places where the wedge members engage them, that is to say, each ring may merely have bevel-bottomed slots for reception of the respective wedges. At their inner ends the wedge members 21 have shorter beveled surfaces 29 inclined oppositely to the beveled surfaces 25, and the inner end of each wedge member 21 is connected to a flexible motion-transmitting element such as a link chain 30 or 31.

From their points of connection to the respective wedges 21, the chains 30 and 31 extend inwardly in substantially radial runs and then bend in passing through suitable curved rigid-walled guideways to merge with substantially straight runs which lie parallel to the axis of rotation of the pulley. Each of these parallel runs of the chains 30 and 31 extends along the shaft assembly to a pin 33 or 34 respectively (Fig. 6), which protrudes from an axially movable actuator member 35. This actuator member 35 is rotatable with the shaft 8 but is axially slidable relative thereto.

As here illustrated, the actuator 35 is a cylindrical member and is arranged to slide within a tubular portion of the shaft 8, such tubular portion being at the opposite end of the shaft from that which is designed to have connected to it the power-receiving or power-delivery connections, as the case may be. In order to accommodate the axial runs of the chains 30 and 31, the actuator 35 is provided with longitudinally extending slots or channels in its outer surface. Since the chains are confined in rigid guideways, they can act to transmit thrust as well as pull and are thus effective to transmit movement to the wedge members from the actuators, regardless of the direction of movement of the latter. However, due to the action of centrifugal force, the wedges tend to move radially outward when the shafts are rotating, so that normally the chains are only called upon to prevent such outward movement, or to move the rings inwardly, in other words, to act as tension elements, and thus the confining guideways for the chains are not ordinarily necessary.

With this construction outward movement of the actuator 35 (that is to say, movement away from the pulley face) causes a corresponding movement of the parallel axial runs of the chains 30 and 31 and thereby causes the radially disposed runs of the chains to move the wedge members 21 inwardly, that is to say, toward the axis of the pulley. On the other hand, when the actuator 35 is moved toward the face of the pulley 10, the chains 30 and 31, being confined in the rigid-walled guideways, are effective to push the wedge members 21 outwardly, that is, away from the axis of the pulley, or at least to allow the wedges to move out by centrifugal action.

Figure 7:
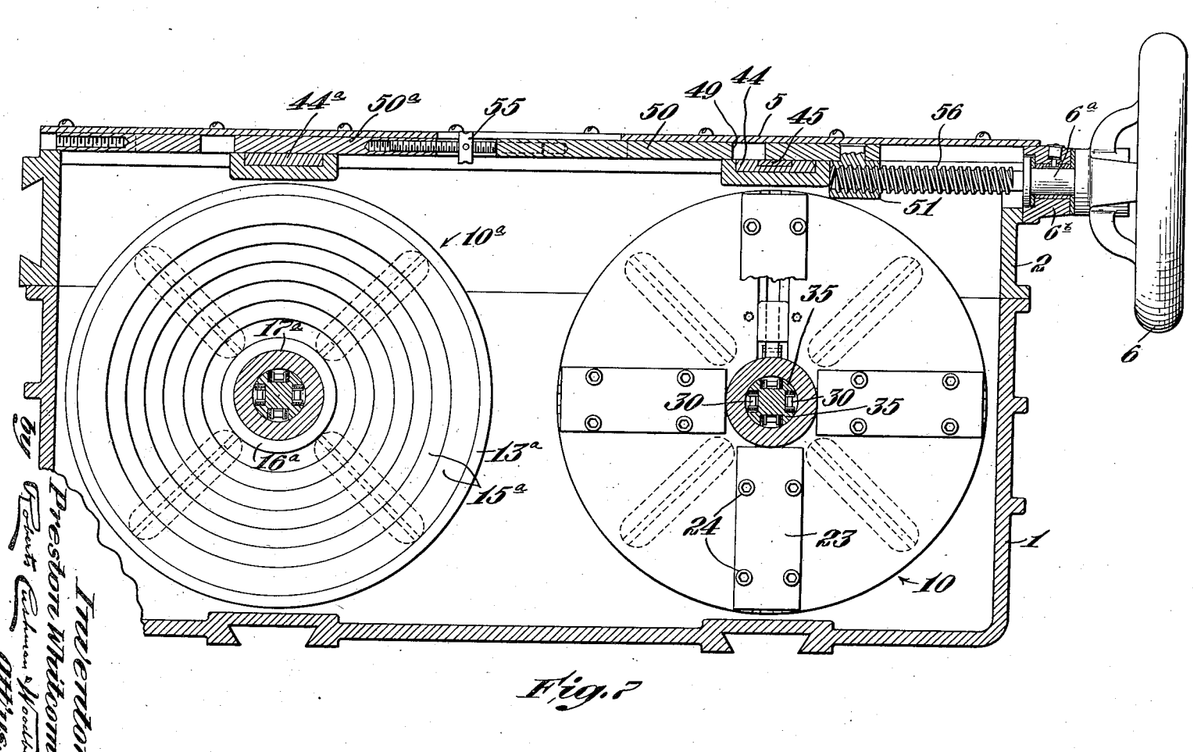
Fig. 7 is a fragmentary vertical section of the transmission, certain parts being shown in elevation.
Figures 8, 9, 10, 11:
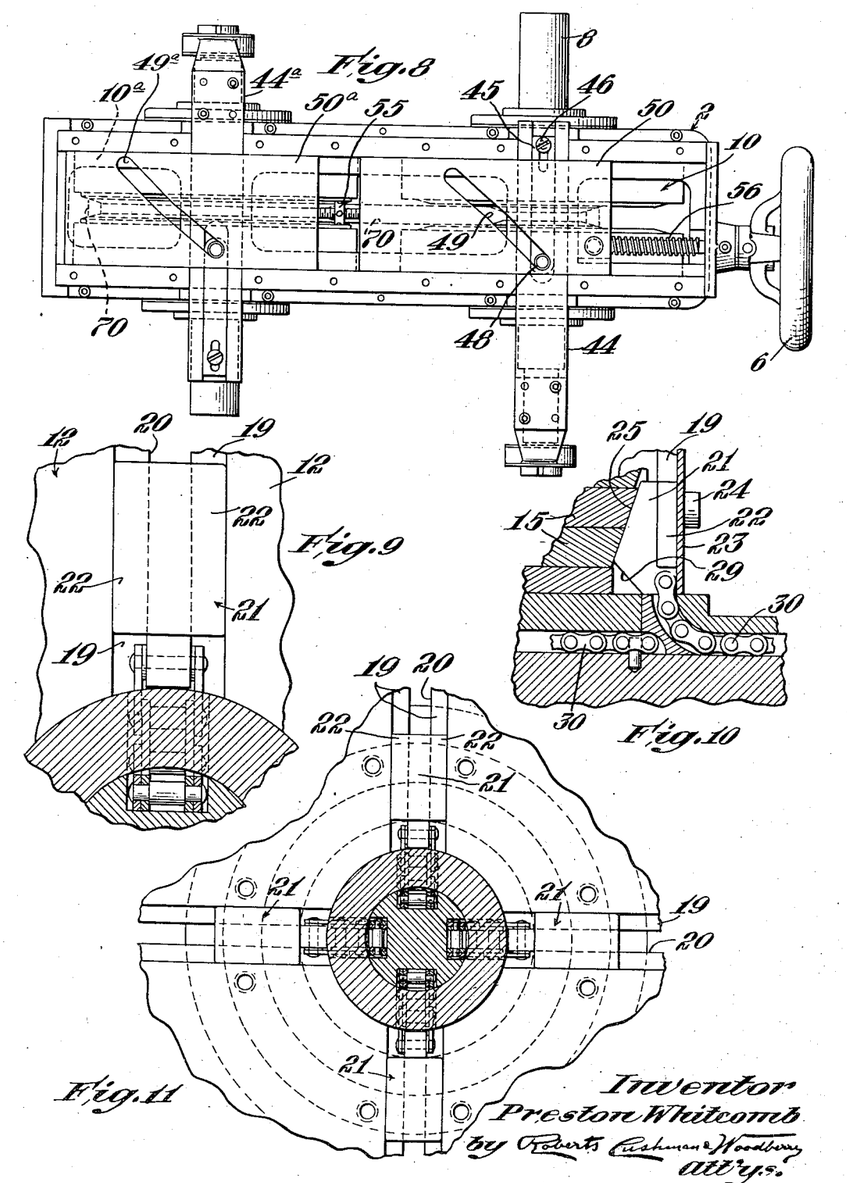
Fig. 8 is a plan view, to smaller scale than Fig. 7, of the transmission with the top cover removed.
Fig. 9 is a detail view, partly in section and partly in elevation, of a portion of the adjusting means for one pulley.
Fig. 10 is a similar view of such means but taken on a plane at right angles to that of Fig. 9.
Fig. 11 is a sectional view of a portion of the shaft assembly showing parts of the adjusting means and parts of a pulley.

Mounted on the outer end of the actuator 35 is an anti-friction bearing 39. As shown, this is a ball bearing including an outer ring 40. To this outer ring is secured the lower end of an upstanding rigid arm or bracket 41 (Figs. 2 and 8). As here illustrated, this arm or bracket 41 is located outside of the casing of the apparatus and reaches up to a point near the top of the casing where it is secured to a transversely extending slide 44 (Figs. 1, 7 and 8) which is mounted in a guideway in the upper portion 2 of the casing. The slide 44 is provided with a longitudinal guideway for the reception of a stud-carrying bar 45 having an elongate slot for the reception of a screw 46 by means of which the bar may be held in adjusted position lengthwise of the slide 44. The bar 45 carries a roller stud 48 constituting a cam follower which engages a cam slot 49 in a cam plate 50, the latter sliding in suitable guides in the upper part of the housing 2 and being normally retained in place by the cover 5 (Fig. 7).

Figure 5:
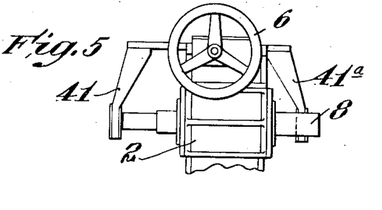
Fig. 5 is an end elevation, to smaller scale, of a portion of the transmission shown in Figs. 1 and 2.

The pulley 10$^a$ which is mounted on the shaft 8$^a$ is in general similar to the pulley 10 just described and the corresponding parts which are illustrated are identified by corresponding reference characters. The transversely movable slide 44$^a$ for the pulley 10$^a$, as shown in Fig. 8, is connected to an arm 41$^a$ (Fig. 5) disposed at the opposite side of the casing 1 from the arm 41, and the cam slot 49$^a$ and the plate 50$^a$ is generally parallel to the slot 49 in the plate 50 but, as shown, these slots 49 and 49$^a$ are not exactly straight, and are somewhat concave toward each other.

Preferably the cam plates 50 and 50$^a$ are connected to each other by an adjusting screw 55 thereby to permit variation of the initial spacing of these plates, for example, to provide for initial tensioning of the belt. Normally the adjusting screw holds the plates fixed relatively to each other so that the two plates move as a unit in the same direction and to the same degree. The shaft 6$^a$ to which the hand wheel 6 is secured and whose outer portion turns in the bearing 6$^b$ carried by the housing 2 has its opposite or inner end portion screw threaded for engagement with an internally screw-threaded nut member 51 fixed to and depending from the plate 50. Accordingly, rotation of the hand wheel results in simultaneous longitudinal movement of the cam plates 50 and 50$^a$.

Figure 12:
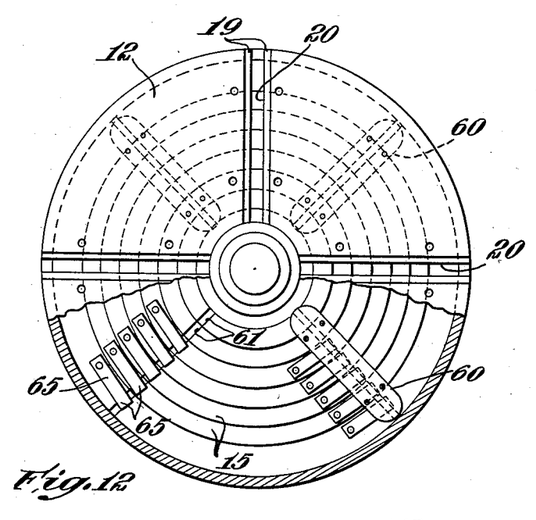
Fig. 12 is a side elevation of a pulley with parts broken away; in section; and in dotted lines, respectively.
Figure 13:
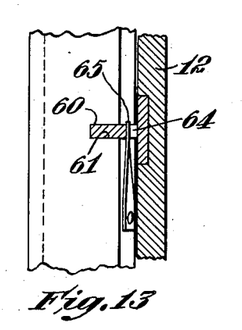
Fig. 13 is a sectional detail, to large scale, some parts being shown in elevation.

Reverting again to the construction of the pulleys and referring particularly to Figs. 12 and 13, each end plate 12 of the pulley 10 has a plurality of radial slots, four such slots being illustrated, each of which receives the transverse portion of a bar 60 of T-section. Each of these bars comprises an inwardly directed web disposed in a corresponding groove 61 formed in the outer edges of the assembled concentric rings 15. The rings 15 are retained by these bars 60 against relatively circumferential movement so that the rings are constrained to rotate together as a unit and also with the end plates 12 of the pulley, the latter being fixed to the shaft 8. For the major portion of its length, the inwardly directed web of each bar 60 is provided with a slot 64 into which project the free ends of a series of leaf springs 65, one for each of the rings 15. The opposite ends of these springs are secured to the respective rings 15. As thus arranged, the springs 65 constantly urge the rings constituting each pulley face away from the rings which constitute the opposite pulley face, that is to say, tend to move the rings of the two sets away from the median plane of the pulley in opposite directions respectively.

In the alternative construction illustrated in Figs. 15 and 16, the plate 12$^m$, which corresponds in function to one of the end plates 12 of the pulley previously described, is furnished with an outer flange 13$^m$ and an inner flange 13$^n$, the latter fitting about the boss 17 on the shaft 8. The flanges 13$^m$ and 13$^n$ are provided with openings for the reception of the opposite end portions B' and B$^2$, respectively, of a radially extending bar B, the inner end B$^3$ of which fits in a keyway slot K in the boss or hub 17 and thereby provides a positive drive between the plate 12$^m$ and the shaft 8. The bar B extends through elongate slots S (Fig. 16) in the several rings 15$^m$ and is furnished with a series of sockets Z (Fig. 16) in the plane of each of the rings, said sockets receiving springs Q which bear at their outer ends against the corresponding rings. Preferably bars B and associated sets of springs are located at 90° apart around the axis of the shaft 8. The arrangement just described and shown in Figs. 15 and 16 is somewhat simpler than that previously described and may be preferred under some circumstances.

The endless flexible power-transmitting element, here illustrated as a V-belt 70, engages the grooves formed by the opposed faces of the pulleys 10 and 10$^a$, but it is evident that other suitable power-transmitting means may be employed. The belt 70 has beveled or mutually inclined side faces disposed at the same general angle to each other as are the inner edge faces 15$^x$ of the rings 15 constituting the opposed belt-engaging faces of each pulley.

The beveled surface 25 of each wedge member 21 is of sufficient length to permit it simultaneously to engage at least two, and in some positions of adjustment, three of the rings 15. Thus, although as shown in Fig. 6 the belt 70 may simultaneously engage two rings of one pulley, the inner surfaces 15$^x$ of the rings which thus engage the belt are accurately aligned with each other and in effect constitute a single surface complementary to the corresponding beveled side surface of the belt.

In using a transmission of this character, it may be desirable to connect either of the shafts 8 or 8$^a$ to power-receiving means, while the other shaft of the pair is connected to suitable power-delivery means. Thus, as illustrated for example in Fig. 1, the shaft 8 projects from one side of the casing and is provided with connecting means C, for example a clutch, by means of which it may receive driving power from a suitable source, while shaft 8ª projects from the opposite side of the casing and is furnished with connections C', for example a clutch device, by means of which it may deliver power to a machine or other part to be driven.

In the position of the belt and the pulley rings shown in Figs. 6 and 8 for example, the effective diameter of the pulley 10ª is substantially greater than that of the pulley 10 so that the latter, if the driven pulley, will rotate at a substantially higher speed than the former. Actuation of the hand wheel 6 is effective to vary the diameters of the pulleys by causing movement of the cam plates 50 and 50ª which thereby simultaneously moves the roller studs 48 and 48ª so as to move the slides 44 and 44ª transversely, imparting a corresponding movement to the arms 41 and 41ª. This movement, when transmitted through the actuators 35 and 35ª to the corresponding chains 30 and 31, results in a radial movement of the wedges 21,—the wedges of the pulley 10 moving outwardly and thereby tending to press the inner rings 15 toward each other so as to cause the belt 70 to move outwardly. Obviously if this movement be continued, successive rings, farther and farther out along the pulley face, are engaged by the outwardly moving wedges while the inner rings are successively disengaged from the wedge. Concomitantly with the outward movement of the wedges 21 of the pulley 10, the wedges of pulley 10ª are moved inwardly so as to disengage the outermost rings 15ª, the latter then being moved inwardly by their corresponding springs. Accordingly as the effective diameter of one pulley is increased, the effective diameter of the other pulley is decreased. Obviously a movement of the cam plates 50 and 50ª in the opposite direction from that just described will produce correspondingly opposite changes in the effective diameters of the pulleys.

Figure 3:
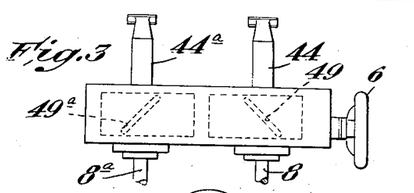
Fig. 3 is a diagrammatic view, to smaller scale, of an optional arrangement of such a transmission.
Figure 4:
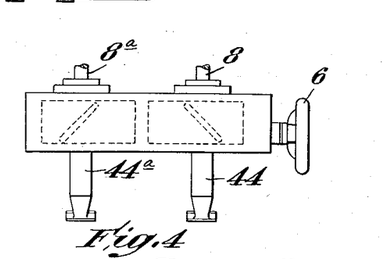
Fig. 4 is a similar view of another optional arrangement.

The apparatus here described is so constructed and arranged that it may be varied very easily to suit different driving conditions. Thus as shown in Fig. 3, the cam plates are so disposed that the slots 49 and 49ª converge instead of being generally parallel to each other. Such an arrangement may be employed when it is desired to have the power-receiving and power-delivery ends of the shafts both located at the same side of the casing with the arms 41 and 41ª both at the opposite side of the casing, as diagrammatically indicated in Fig. 3. However, with the cam slots positioned in the same way, the positions of the shafts may be reversed so that the power-receiving and power-delivery connections are at the other side of the casing, such an arrangement being illustrated in Fig. 4.

Figure 1:
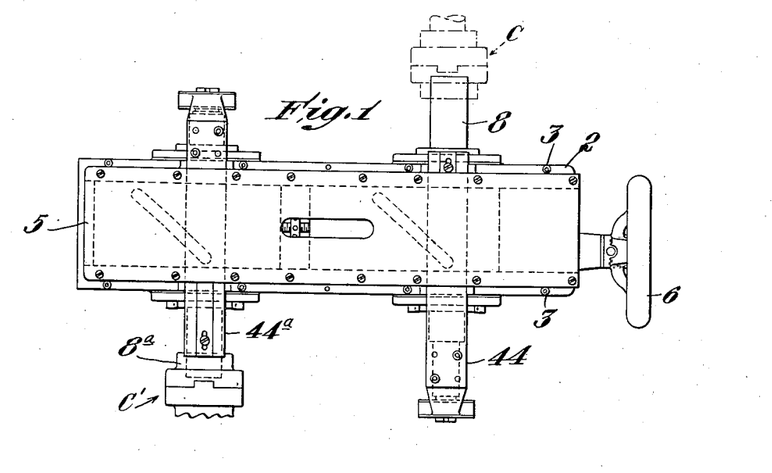
Fig. 1 is a plan view, to small scale, of a variable speed transmission incorporating the principles of the present invention.
Figure 2:
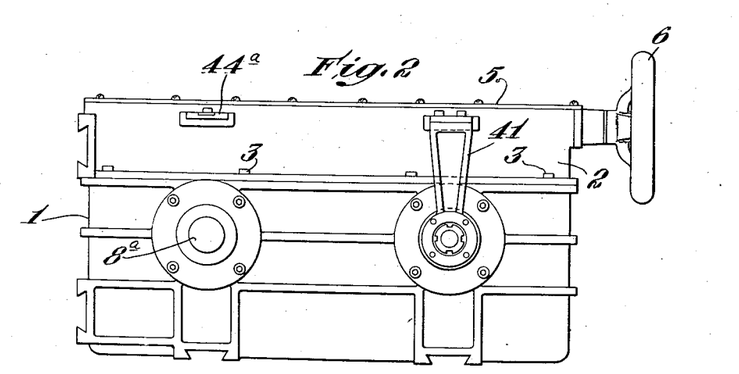
Fig. 2 is a side elevation of the same.

On the other hand, it is possible, as above suggested, to arrange the shafts 8 and 8ª as shown in Fig. 1, so that the power-receiving connections are at one side of the casing and the power-delivery connections at the opposite side.

It is also evident that the hand wheel 6 may be arranged at either end of the machine and that the desired location of the power-receiving and delivery means may be obtained merely by assembling the parts illustrated in different ways and without requiring the use of special parts or the provision of extra parts to be used in accordance with the specific purpose of the apparatus. It may be noted in this connection that the cam plate 50ª is preferably provided with an internally screw-threaded nut member 51 at each end so that it may be reversed end-for-end thereby to change the slope of the cam slot 49 relative to the slope of the cam slot 49ª.

One extremely important feature of the invention is the effect obtainable by proper configuration of the cam slots 49 and 49ª, since the shape and slope of each slot independently determines the direction and rate of movement of the ring actuating wedge of one of the respective pulleys.

The length of a belt for transmitting power between two pulleys is determinable by a well known mathematical formula which clearly indicates that if the ratio of change of effective diameters of the pulleys be a straight-line function, the length of belt for uniform tension must likewise be varied. Since in the instant case the length of the belt cannot be varied, the alternative, if belt tension is to remain unchanged for different speed ratios, is to effect the change in relative pulley diameter in accordance with a non-constant ratio. To this end the cam slots 49 and 49ª, instead of being straight, are slightly curved, or at least comprise portions which are not aligned. Thus the slots 49 and 49ª as here shown each comprises two portions, one of which is more steeply sloped than the other. Thus a given movement of the hand wheel 6 will produce a greater movement of the actuating wedges 21 when the pulley 10 is of small effective diameter than will be caused by a similar movement of the hand wheel when the pulley has a relatively large diameter.

It will similarly be noted that the slot 49ª has two portions, one of which is more steeply sloped than the other so as to permit a corresponding variation in the rate of adjustment of the diameter of the pulley 10ª. While cams having straight portions of different slope are usually sufficiently accurate, it is contemplated, as indicated above, that these slots may be smoothly curved according to any desired formula. With the arrangement just described, the belt 70 may be maintained under a practically uniform tension despite wide variations in the effective diameters of the pulleys.

For example, assuming that the belt is properly tensioned when the pulleys have equal effective diameters, but that the effective diameter of one pulley is then increased by two inches while the effective diameter of the other pulley is decreased by an equal amount, there would be a tendency to stretch the belt due to the geometrical relationship of the belt to the circumferential portions of the pulleys about which it is wrapped and of the short straight belt runs relative to each other and to the pulleys. Therefore, if one pulley has its effective diameter decreased by two inches, it is desirable to increase the diameter of the other pulley by somewhat less than two inches, thus permitting the belt to remain under the same tension as was the case when the pulleys had equal effective diameters.

It is evident that the illustrated arrangement affords such a result, permitting simultaneous adjustment of the pulleys to cause a somewhat smaller change in the larger effective diameter of the pulley than in the smaller effective diameter of the other pulley and causing the sums of their diameters to be at a maximum when these diameters are equal.

The screw 55 for varying the relative position of the cam plates 50 and 50a affords an initial adjustment to compensate for minor variations in the length of the belt 70 so that proper frictional engagement of the latter with the pulleys may be readily obtained.

Figure 14:
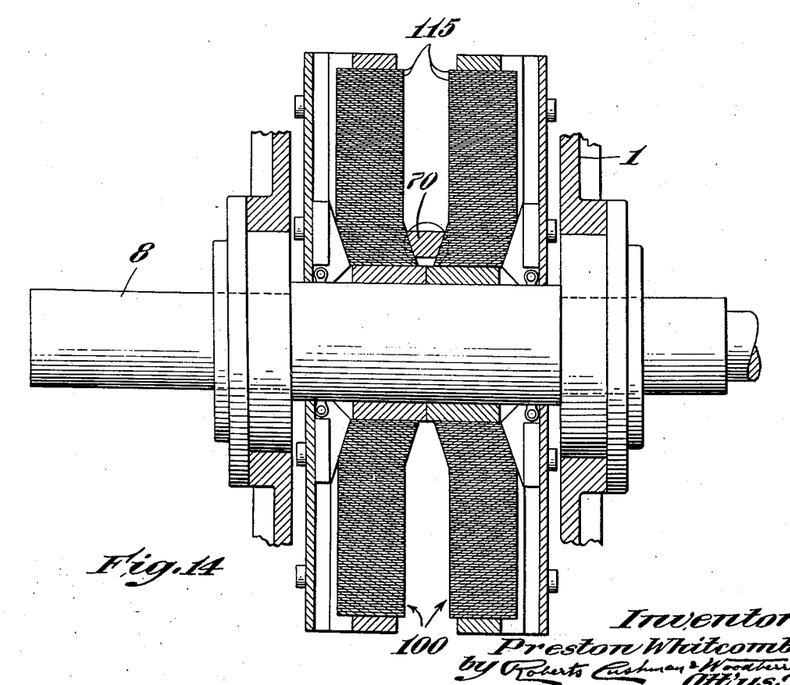
Fig. 14 is a sectional view of a modified pulley assembly, certain parts being shown in elevation.

It is to be understood that the principles of this invention may be varied in many ways. For example, Fig. 14 shows an optional arrangement of rings wherein the independent concentric rings 15 of Fig. 6, for example, are replaced by rings 115 constituting successive convolutions of a closely wound flexible coil 115 of clock-spring type, such a coil being wound from a single elongate ribbon of metal and then suitably tempered. Such a coil may be formed of very thin metal so that the edges of the belt-engaging convolutions or rings do not provide corners which project to any substantial extent to bite into the side surfaces of the belt. If preferred, the inner surfaces of these convolutions 115 may be beveled to correspond to the beveling of the rings 15 shown in Fig. 6.

With an arrangement of this latter character, the springs 65 may be omitted, if desired, and the outer convolution of the spring 100 may be secured to the corresponding peripheral flange of an end plate 12. Thus, under these conditions the inherent resiliency of the spring 100 will perform the same function as is afforded by the springs 65 in the preferred embodiment of the invention. In fact, the springs of Figs. 12 and 13; and 15 and 16 are not wholly necessary and may be omitted if desired.

It is evident that the present invention affords a simple, compact and readily controllable transmission of the variable speed type and that the control means therefor may be so arranged that the driving and driven shaft portions may be disposed close to the driving and driven pulleys, respectively, thus permitting compactness in an installation in which such a transmission is employed. Obviously, the hand wheel 6, or the shaft 6ª, may be automatically turned by appropriate means, for example, a part which moves in response to a variation in speed of a driven part, or which responds to the progress of an operation being performed, so as thereby either to turn shaft 6ª one way or the other to maintain constant speed in the driven part or progressively to change the speed of a part, respectively.

Moreover, although the tension-maintaining cams of the present invention are described with particular reference to the variation of the relative diameters of pulleys each having a belt-engaging face comprising relatively movable rings, it is to be understood that this feature of the invention is broadly applicable to speed-varying devices of specifically different constructions, for instance, to cam pulley transmissions.

It is also to be understood that while a V-belt has been suggested as the means for transmitting power from one pulley to the other, any known equivalent may be employed, with such corresponding change in the configuration of the pulley faces as will be requisite.

It is furthermore evident that the principles of this invention may be varied to permit different arrangements of the driving and driven shafts to suit different installations.

I claim:

1. A variable speed transmission of the kind which includes a pair of rotatable pulleys having opposed faces designed to receive between them, a flexible driving element for transmitting power, said opposed faces of the pulley each comprising a set of axially movable rings, movable wedges carried by the pulley and each operative to urge the rings of one set toward the rings of the opposite set, and means carried by said pulley for guiding said wedges along definite paths, characterized in having a tubular shaft upon which the pulley is mounted, an actuator arranged to slide axially within said tubular shaft, said actuator being provided with longitudinal channels in its outer surface and the shaft having curved guideways therein each communicating at its inner end with one of the respective channels in the actuator and having its outer end portion aligned with the path of one of the wedges, and motion-transmitting means housed in said channels and guideways and constructed and arranged to transmit axial movement of the actuator to the wedges thereby simultaneously to move the wedges and thus vary the effective diameter of said pulley.

2. A variable speed transmission comprising a pair of rotatable pulleys, each of the pulleys including a pair of opposed faces, each of said faces comprising a plurality of rings each adjustable in the direction of its axis toward or away from a corresponding ring of the opposite face of the same pulley, a flexible endless driving element for transmitting power between the pulleys, and mechanism operative to cause simultaneous movement of corresponding rings of each of the pulley faces thereby to produce an increase in the effective diameter of one pulley while simultaneously causing a decrease in the corresponding effective diameter of the other pulley, said mechanism including radially movable wedges each operative by radial movement successively to engage and axially to move the rings of one pulley, respectively, a pair of wedge-actuating cams, and motion-transmitting means between the cams and wedges, the cams being so constructed and arranged as to cause a greater change in the effective diameter of the pulley which, for the time being, is of smaller effective diameter than in the effective diameter of the other pulley, thereby to maintain proper tension of the endless drive element at all speed ratios of the pulleys.

3. A variable speed transmission including a casing, a pair of parallel shafts, each having a pulley thereon mounted within the casing, a flexible endless drive element for transmitting power from one pulley to the other, each of the pulleys having a pair of opposed faces for engagement by the driving element, each of said faces comprising a set of concentric relatively movable rings, each ring being movable in the direction of its axis toward or from a corresponding ring of the opposite set, a single ring-adjusting actuator for each pulley, each actuator being coaxial with its pulley and located at one side of its pulley, and control mechanism operative simultaneously to move the actuators, the control mechanism comprising movable cam-supporting means, cam elements carried thereby, cooperating cam followers arranged to move in paths parallel to the axes of the pulleys, means for transmitting movement of the cam followers to the respective actuators, and manually actuable means for moving the cam-supporting means, said cam elements being so respectively contoured and relatively arranged as to cause the rings of one pulley to approach while the rings of the other pulley correspondingly recede from each other, characterized in that each of the actuators is movable axially of its corresponding shaft and in having connections, including substantially inextensible, flexible, motion-transmitting elements, between each actuator and both sets of rings of the corresponding pulley, said connections being so constructed and arranged as to convert axially directed stress resulting from axial movement of the actuator into a radially acting stress operative to adjust the rings.

4. A variable speed transmission comprising a pair of rotatable pulleys, a flexible driving element for transmitting power between the pulleys, each of the pulleys including a pair of opposed belt-engaging faces, one at least of said faces of each pulley comprising a plurality of rings each adjustable in the direction of its axis toward or away from a corresponding ring of the opposite face of the same pulley, an actuator coaxial with each pulley, each actuator being movable in an axial direction, and means including a radially movable wedge and a flexible substantially inextensible transmitting member operative, while the pulleys are rotating, simultaneously to transmit motion from each actuator to the rings of the corresponding pulley, the parts being so constructed and arranged that axial movement of said actuators effects simultaneous but inverse movement of the rings in the respective pulleys.

5. A variable speed transmission including a rotatable pulley having opposed faces designed to receive between them a flexible driving element for transmitting power, each of the opposed faces of the pulley comprising a set of rings, each ring of each set being adjustable axially toward or away from a corresponding ring of the other set, an actuator coaxial with and disposed to one side of the pulley, the actuator being movable in an axial direction, and means including a flexible thrust-transmitting element of substantially invariable length for converting axial movement of the actuator into simultaneous axial movement of rings of both sets such as to vary the effective diameter of said pulley, and control mechanism operative to move the actuator.

6. A variable speed transmission comprising a casing, a pair of rotatable pulleys mounted within said casing, a flexible driving element for transmitting power between the pulleys, one at least of the pulleys having opposed faces each comprising a plurality of rings adjustable in the direction of the pulley axis toward or away from the corresponding ring of the opposite face of the same pulley, an actuator coaxial with said latter pulley, a shaft upon which said latter pulley is mounted, the actuator being slidable in a direction axial of said shaft, chains having runs thereof disposed substantially at right angles to each other and a curved portion housed in a rigid-walled guideway, a ring-moving element connected to the radial run of each chain, the parts being so constructed and arranged that axial movement of the actuator effects simultaneous movement of corresponding rings in opposed faces of the pulley, and means operative to move the actuator.

7. A variable speed transmission comprising a casing, a pair of rotatable pulleys mounted within the casing, a flexible endless drive element for transmitting power between the pulleys, each of the pulleys having a pair of opposed faces for engagement by the driving element, the opposed faces of one at least of the pulleys each comprising a plurality of concentric rings, each adjustable in the direction of its axis toward or from a corresponding ring of the opposite face of the pulley, an actuator coaxial with said latter pulley, a shaft upon which said latter pulley is mounted, the actuator being movable axially of said shaft, connections, including ring-moving elements and substantially inextensible, flexible, thrust-transmitting means, between the actuator and the ring-moving elements of both faces of the pulley such that movement of the actuator effects simultaneous movement of corresponding rings in opposed faces of the pulley, a rigid arm secured to the actuator at one side only of the casing, and control mechanism including a cam member operative to move said arm.

8. A variable speed transmission comprising a pair of rotatable pulleys, each of the pulleys including a pair of opposed faces, one face of each pair comprising a plurality of rings each adjustable in the direction of its axis toward or away from the opposite pulley face, an actuator coaxial with each pulley and movable in an axial direction relative thereto, means for adjustably varying the position of said actuator relative to the pulley, a plurality of flexible elements each having a run parallel to the axis of the pulley and a run extending radially, the axial run of each of said elements being connected respectively to one of the actuators, and a wedge member connected to the radially disposed runs of said respective flexible elements and engageable respectively with the rings of one pulley face to cause variation in the positioning of said rings in response to axial movement of said actuators.

9. A variable speed transmission comprising a casing, a pair of rotatable pulleys mounted within the casing, a flexible endless drive element for transmitting power between the pulleys, each of the pulleys having a pair of opposed faces for engagement by the driving element, each of said faces comprising a plurality of concentric rings, each movable in the direction of its axis toward or from a corresponding ring of the opposite face of the pulley, radially movable wedges for moving the rings axially, an actuator coaxial with each pulley, a shaft upon which each pulley is mounted, each of said actuators being movable axially of its corresponding shaft, flexible, motion-transmission elements connecting said actuators and the wedges of the corresponding pulley such that movement of the actuator effects simultaneous movement of corresponding rings in opposed faces of the pulley, a rigid arm secured to each actuator at one side only of the casing, and control mechanism operative simultaneously to move said arms and the actuators associated with the respective pulleys, said control mechanism comprising cam members and cooperating followers arranged to move the respective arms, and a screw-threaded part operative to move said cam members thereby to adjust the rings of each pulley face.

10. A variable speed transmission comprising a frame having therein bearings for a pair of parallel shafts, one of which is a driving shaft and the other of which is a driven shaft, each shaft having provision at one end for the reception respectively of power-receiving and power-delivery connections, a pulley fixed to each shaft, each pulley having opposed faces each comprising a set of axially movable rings and each pulley having a pair of radially movable wedges each operative respectively, by radial movement, to urge the rings of one set toward the rings of the other set, an actuator coaxial with each pulley, means operative simultaneously to move said actuators axially with reference to their respective pulleys, each pulley having associated therewith a flexible thrust-transmitting element capable of flexing transversely of its length, one end of each such flexible element being connected to the corresponding actuator and its other end to one of the wedges, and means for guiding the intermediate portion of each flexible element in a curved path.

11. A variable speed transmission comprising a pair of rotatable pulleys, a flexible driving element for transmitting power between the pulleys, each of the pulleys including a pair of opposed faces, each of said faces comprising a plurality of rings each adjustable in the direction of its axis toward or away from a corresponding ring of the opposite face of the same pulley, an actuator coaxial with each pulley, said actuator being movable in an axial direction, and connections between each actuator and the rings of the corresponding pulley such that axial movement of the actuator effects simultaneous movement of corresponding rings in the opposed faces of the corresponding pulley, each of said actuators extending axially from one side of the pulley, and control mechanism operative simultaneously to move the actuators associated with the respective pulleys, the aforesaid connections comprising a plurality of flexible elements each normally having a run extending parallel to the axis of the corresponding pulley and secured to the corresponding actuator and also having a run extending radially of the pulley, said connections also including wedge members connected to the radially disposed runs of said flexible elements, said wedge members having beveled surfaces to engage complemental surfaces of the respective rings, and spring means associated with the rings and tending to move the rings of each pulley face away from the opposite face.

12. A variable speed transmission comprising a pair of rotatable pulleys, a flexible driving element for transmitting power between the pulleys, each of the pulleys including a pair of opposed faces, each of said faces comprising a plurality of rings each adjustable in the direction of its axis toward or away from a corresponding ring of the opposite face of the same pulley, an actuator coaxial with each pulley, each actuator being movable in an axial direction, and connections between each actuator and the rings of the corresponding pulley such that axial movement of the actuator effects simultaneous movement of corresponding rings in opposed faces of the corresponding pulley, said rings being constituted by adjoining concentric convolutions of a helical spring formed out of a single strip of thin metal.

13. A variable speed transmission comprising a pair of rotatable pulleys, each of which comprises opposed beveled faces for engaging a V-belt or the like, one at least of the opposed faces of each pulley being formed of a plurality of concentric rings, said rings being constituted by adjoining coils of a tightly wound spiral spring formed of a strip of thin metal, and means for adjusting the said rings of each pulley axially thereby to cause their inner edges collectively to form a beveled surface for engagement by the belt, the rings and the adjusting means for each pulley being so constructed and arranged as to permit positioning said belt at different distances from the pulley axis and thereby correspondingly varying the effective diameter of the pulley.

PRESTON WHITCOMB.